(12) United States Patent
Sigel et al.

(10) Patent No.: US 7,187,481 B1
(45) Date of Patent: *Mar. 6, 2007

(54) SYSTEM AND METHOD FOR PROVIDING GAIN AND THRESHOLDING TO A HOLOGRAPHIC DATA PARALLEL RECORDING AND REPLICATION SYSTEM INCORPORATING INDEPENDENT ANGULAR ADDRESS ASSIGNMENT

(75) Inventors: Christophe Sigel, Broomfield, CO (US); Michael L. Leonhardt, Longmont, CO (US)

(73) Assignee: Storage Technology Corporation, Louisville, CO (US)

( * ) Notice: Subject to any disclaimer, the term of this patent is extended or adjusted under 35 U.S.C. 154(b) by 264 days.

This patent is subject to a terminal disclaimer.

(21) Appl. No.: 11/021,887

(22) Filed: Dec. 23, 2004

(51) Int. Cl.
*G03H 1/02* (2006.01)
(52) U.S. Cl. .............................. 359/28; 359/10; 359/35; 359/12; 430/1
(58) Field of Classification Search ................ 359/10, 359/12, 28, 35; 430/1, 2; 369/103
See application file for complete search history.

(56) References Cited

U.S. PATENT DOCUMENTS

| | | | | |
|---|---|---|---|---|
| 4,576,434 | A | * | 3/1986 | Huignard et al. ............... 359/7 |
| 4,750,153 | A | * | 6/1988 | Owechko et al. ............ 365/125 |
| 6,369,377 | B1 | | 4/2002 | Shih et al. ................... 250/225 |
| 6,449,225 | B1 | | 9/2002 | Alon ........................ 369/44.17 |
| 2002/0191239 | A1 | * | 12/2002 | Psaltis et al. ................. 359/26 |

OTHER PUBLICATIONS

A. Sinha and G. Barbastathis, "Resonant holography", Optics Letters, 27(6), pp. 385-387(2002).*
System and Method for Parallel Selection and Retrieval of Data Stored in a Holographic Data Storage Medium, Sigel et al., Dec. 23, 2004.
System and Method for Parallel Selective Replication and Angular Remapping of Data Content Stored in a Holographic Data Storage Medium, Sigel et al., Dec. 23, 2004.
System and Method for Parallel Selective Replication and Data Address Remapping of Data Content Stored in a Holographic Data Storage Medium, Sigel et al., Dec. 23, 2004.
Scheme Capable of Providing Gain and Thresholding to the Parallel Recording and Replication of Holographic Media, Silveira, Sep. 3, 2004.

* cited by examiner

*Primary Examiner*—Leonidas Boutsikaris
(74) *Attorney, Agent, or Firm*—Brooks Kushman P.C.

(57) ABSTRACT

System and method for providing gain and thresholding to a holographic data parallel recording and replication system incorporating independent angular address assignment. A plurality of information bearing light beams in an information bearing light beam arm of a data recording system and a plurality of reference light beams in a reference light beam arm of the data recording system are mutually interfered to store a plurality of spatially separate, spatially modulated light intensity patterns in a holographic data storage medium in a data recording operation. During the data recording operation, the plurality of information bearing light beams are repeatedly circulated through the holographic data storage medium using a resonant cavity formed along the information bearing light beam arm of the holographic recording system.

20 Claims, 4 Drawing Sheets

SYSTEM AND METHOD FOR PROVIDING GAIN AND THRESHOLDING TO A HOLOGRAPHIC DATA PARALLEL RECORDING AND REPLICATION SYSTEM INCORPORATING INDEPENDENT ANGULAR ADDRESS ASSIGNMENT

CROSS-REFERENCE TO RELATED APPLICATIONS

The present application is related to co-pending applications entitled "SYSTEM AND METHOD FOR PARALLEL SELECTION AND RETRIEVAL OF DATA STORED IN A HOLOGRAPHIC DATA STORAGE MEDIUM", Ser. No. 11/021,930, "SYSTEM AND METHOD FOR PARALLEL SELECTIVE REPLICATION AND ANGULAR ADDRESS REMAPPING OF DATA CONTENT STORED IN A HOLOGRAPHIC DATA STORAGE MEDIUM", Ser. No. 11/021,235, and "SYSTEM AND METHOD FOR PARALLEL SELECTIVE REPLICATION AND DATA ADDRESS REMAPPING OF DATA CONTENT STORED IN A HOLOGRAPHIC DATA STORAGE MEDIUM", Ser. No. 11/021,667, all filed on even date herewith. All the above applications are assigned to the same assignee and are incorporated herein by reference.

BACKGROUND OF THE INVENTION

1. Field of the Invention

The present invention relates generally to the field of holographic data storage and, more particularly, to a system and method for providing gain and thresholding to a holographic data parallel recording and replication system incorporating independent angular address assignment.

2. Background of the Invention

Within a data storage system, data transfers can be attributed to the primary tasks of data storage and recall arising from user requests, but also to data management tasks within a data storage system. Data transfers arising from data management tasks represent an increasingly significant proportion of the total data transfer volume. Data management tasks may require retrieval, transfer and replication or copy of data and, in some cases, data re-arrangement prior to copy.

For data storage systems, data replication is a multi-step process, which typically involves sequential recall of data, writing of this data to a temporary buffer memory, and subsequent writing of this data back to a copy storage medium. This process is speed limited by device data rates and available system resources-including the bandwidth necessary to support these multiple data transfers.

A replication process involving additional re-arrangement of individual copy data storage addresses to form a different copy storage structure prior to copying is hereby also termed as content migration.

One exemplary data management task is the reclamation of storage capacity occupied by data which has no longer any useful value. Such data, hereby also termed as useless data, includes but is not limited to, data which has expired, is superceded, or is erroneous. The continued storage of useless archived data, which, for the most part, is stored on magnetic tape storage media, results in a decrease in the useful data capacity of the storage media, leading to wasted storage capacity. Because of tape load and positioning times, and the problem of matching storage location sizes, overwriting of random tape sectors containing useless data with new data is not an efficient solution. In fact, it is more efficient to copy all useful data to an empty tape storage medium in a single copying step. Copying all useful data to an empty tape, however, is both time and resource consuming as the procedure is based on a multi-step process that involves recalling all useful tape data, writing the useful data to a disk buffer and, subsequently, writing the data back to tape. It is estimated that 20–50% of data movement to and from real tape in virtual tape environments are due to this reclamation process.

For archive storage applications, holographic data storage permits high density storage by allowing a plurality of data pages to be stored within the same volume of a holographic data storage medium by recording multiple overlapping spatial gratings or holograms. Various multiplexing methods can be implemented to store the plurality of data pages within the same volume of a holographic data storage medium. Some multiplexing methods are based on Bragg selectivity, such as angle or wavelength multiplexing, where either the angle of incidence or the recording wavelength of a reference beam is varied. Due to its page-based data organization, holographic data storage and read-out is inherently page parallel, thus enabling higher data transfer rates.

A volumetric holographic data storage medium is organized into a plurality of spatially separate data sites with each data site having a plurality of superimposed multiplexed data units. A data unit represents the fundamental element used to organize and record data in a physical volume element, which in the case of page-based holographic storage is a 2-dimensional array of data bits also designated as a data page. For other types of media, the data unit may be a single bit. Examples of data site arrangements on a data storage medium include, but are not restricted to, a grid-like organization for a cubic holographic memory; or a periodic spacing along multiple concentric tracks, in the case of a holographic disk.

Low-cost, photopolymer-based holographic data storage media having a high storage density and a write once-read many times capability have recently been commercialized; and rewritable holographic data storage media is currently being developed. It is expected, however, that at least initially, any re-writing process will involve an erasing step, for example, by illuminating the medium at a different wavelength. Also, because high density holographic data storage generally involves recording a plurality of pages or data units in the same volume, the possibility of direct data overwriting for holographic storage is precluded, as the erasing process affects all multiplexed holograms within a same volume. As a result, a system that incorporates holographic data storage for data backup and archive purposes will also require some procedure for reclamation of capacity, and more generally for the retrieval and transfer of data prior to its copy onto another holographic data storage medium.

An important feature of holography is that it allows simultaneous optical retrieval of several data pages recorded in a holographic medium and their direct simultaneous recording onto a second holographic medium. The direct replication eliminates the sequential electronic detection, analog to digital conversion and electronic signal processing steps necessary for performing data signal regeneration, and enables offline data replication, thus freeing up storage system resources. By copying data within this highly parallel optical domain, the data rate limitations of today's serial data handling storage devices can be overcome.

Previous proposals, for example, as described in U.S. Patent Publication No. 20030161246, published on Aug. 28, 2003, and entitled HOLOGRAPHIC DISK RECORDING SYSTEM, for parallel replication of holographically recorded data deal exclusively with the problem of full content replication. The proposals include illuminating the holographic data storage medium with a broad reference beam, whose angle of incidence can be changed in order to recover all similarly angularly addressed data pages from multiple data storage sites. The optically reconstructed data signals are then conveyed by a suitable imaging system onto a holographic replication medium, also illuminated by a broad reference beam with the appropriate angle of incidence. The replication medium records multiple volume holograms constituted by refractive index and/or absorption gratings proportional to the spatial modulation of light intensity resulting from the interference between the optical signal beam and reference beam within the medium.

Although the above-described procedure enables parallel readout of multiple data pages and direct replication, it does not permit partial data selection, for example, selection of only useful data for replication. Since the broad illumination beam illuminates a plurality of data sites indiscriminately, both useful data and useless data are simultaneously reconstructed and subsequently replicated. Therefore, the procedure is unsuitable for applications requiring copying or replication of selected data from a volume of stored data.

The above-referenced, commonly assigned, co-pending application entitled "SYSTEM AND METHOD FOR PARALLEL SELECTIVE REPLICATION AND DATA ADDRESS REMAPPING OF DATA CONTENT STORED IN A HOLOGRAPHIC DATA STORAGE MEDIUM", Ser. No. 11/021,667, provides a system and method for selectively replicating in parallel holographically stored data that enables data stored in one or more holographic data storage media to be selectively replicated in another holographic data storage medium, while, at the same time, providing the additional capability of independent remapping of the data being copied to a different copy data address. The system incorporates a multi beam controller system, disclosed in the above-referenced, commonly assigned, co-pending application entitled "SYSTEM AND METHOD FOR PARALLEL SELECTION AND RETRIEVAL OF DATA STORED IN A HOLOGRAPHIC DATA STORAGE MEDIUM", Ser. No. 11/021,930, and which forms a multi-beam illumination system capable of independently controlling the angles of incidence of each of a plurality of beams, hereby used both as a selective parallel retrieval system and as part of a parallel recording system, allowing independent angular copy address assignment. The above described replication system enables fast offline management of holographically stored data, by enabling parallel retrieval of partial content and its direct simultaneous replication to a different copy data address on a target medium.

However, all above described parallel holographic replication processes suffer from limitations, due to the lack of a signal regenerating process. Thus, similarly to processes for photocopying paper documents, the copies (and copies of the copies) present a lower signal-to-noise ratio (SNR) than the original. Today's data storage systems provide electronic signal processing (typically by digital processes after an analog to digital conversion of the data has occurred) to maintain the integrity of the data copies by preserving its SNR. One alternative would be to apply this same type of electronic detection to every holographically stored data bit before recording it optically. This method, however, suffers from electronic transfer rate limitations described above.

The above-mentioned co-pending, commonly assigned patent application entitled "SCHEME CAPABLE OF PROVIDING GAIN AND THRESHOLDING TO THE PARALLEL RECORDING AND REPLICATION OF HOLOGRAPHIC MEDIA", Ser. No. 10/934,185, filed on Sep. 3, 2004, the disclosure of which is hereby incorporated by reference, discloses the use of a resonant cavity for providing gain and thresholding to the holographic parallel recording of data. In the application, parallel recording is achieved by means of a single reference recording beam mutually interfering, within a holographic data storage medium, with multiple spatially separated data beams to affect the parallel recording of multiple holograms with identical angular addresses, the cavity being formed along the reference beam arm. The invention, while providing a method for parallel data regeneration during parallel recording thereof, only allows for the data to be replicated to identical angular addresses, without providing a means for independently assigning different recording addresses to the data being simultaneously recorded. Furthermore the configuration employed for forming the resonant cavity, which therein is placed in the single beam reference arm, is only suitable for a single beam or a plurality of spatially separated and plane wave beams impinging at normal incidence on the surface of the reflective elements, and must be modified when employing a plurality of beams in both recording arms.

It would, accordingly, be desirable to provide a method and system enabling the formation of a resonant cavity around a holographic data storage medium, for providing gain and thresholding in a holographic recording system, wherein both the information bearing light beam arm and the reference light beam arm of the holographic recording system comprise an array of optical beams, and wherein the reference light beam arm is comprised of multiple beams, each with a dynamically adjustable angle of incidence.

SUMMARY OF THE INVENTION

The present invention provides a system and method for producing gain and thresholding in a holographic data parallel recording and replication system incorporating independent angular address assignment, thus facilitating the direct transfer of data from a source to a target medium using optical signal processing techniques. A plurality of information bearing light beams in an information bearing light beam arm of a data recording system and a plurality of reference light beams in a reference light beam arm of the data recording system are mutually interfered to form a plurality of spatially separate, spatially modulated light intensity patterns in a holographic data storage medium in a data recording operation. During the data recording operation, the plurality of information bearing light beams are repeatedly circulated through the holographic data storage medium using a resonant cavity formed along the information bearing light beam arm of the holographic data recording system. The invention hereby increases data recording speed and maintains the signal-to-noise ratio of the original data in the copy, therefore perpetuating data integrity. The invention allows fully taking advantage of the data rate performance advantages provided by holographic direct parallel replication systems, by providing the same data regenerating features of sequential electronic signal processing without its limitations.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
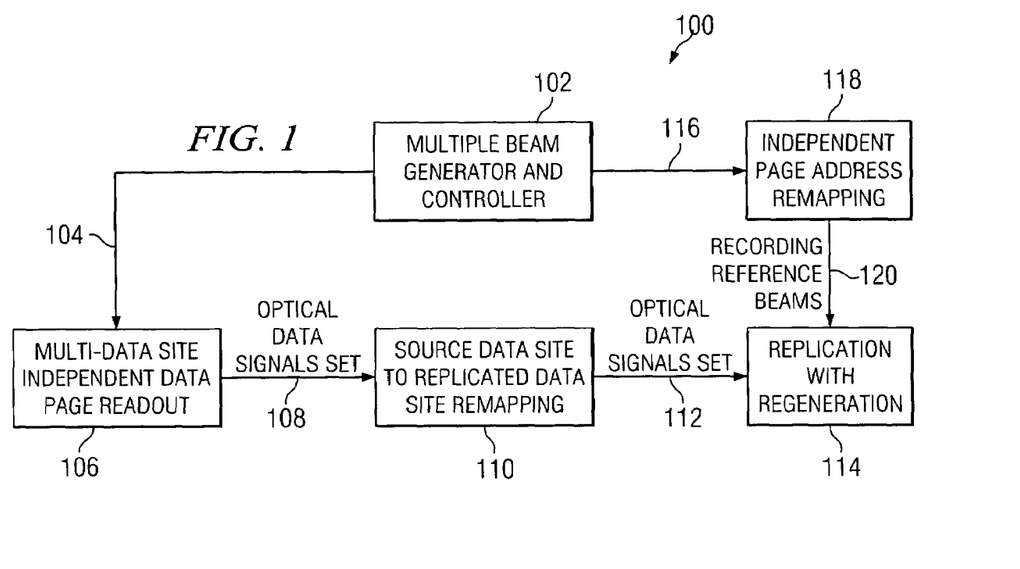
FIG. 1 is a block diagram that illustrates a parallel holographic data replication and address remapping system in accordance with a preferred embodiment of the present invention.

FIG. 1 depicts a block diagram that illustrates a parallel holographic data replication and address remapping system in accordance with a preferred embodiment of the present invention. The system is generally designated by reference number 100, and includes a multiple light beam generator and controller 102 for generating a plurality of input light beams and for dividing the plurality of input light beams into first and second arrays of input light beams. The first array of input light beams 104 is directed to an optical readout apparatus 106. Optical readout apparatus 106 images the first array of light beams onto a selected plurality of data sites of a first holographic data storage medium while independently adjusting the angle of incidence of each light beam with respect to the first holographic data storage medium for optically retrieving a selected plurality of angularly addressed data pages among a plurality of data pages stored in the first holographic data storage medium. Optical readout apparatus 106 thus provides a set of optical data signals schematically represented at 108.

Optical apparatus 110 implements a spatial remapping of the array of optical data signals 108. In particular, apparatus 110 spatially rearranges the reconstructed set of optical data signals 108. The spatially rearranged array of optical data signals, designated as 112, is subsequently imaged onto and illuminates a second holographic data storage medium in which the spatially rearranged array of optical data signals 112 is to be recorded at a plurality of copy data sites, different from their first data storage sites, in the second holographic data storage medium. Optical apparatus 110 is described in greater detail in the above-identified, commonly assigned, co-pending application entitled "SYSTEM AND METHOD FOR PARALLEL SELECTIVE REPLICATION AND DATA ADDRESS REMAPPING OF DATA CONTENT STORED IN A HOLOGRAPHIC DATA STORAGE MEDIUM", Ser. No. 11/021,667.

The second array of input light beams 116 from multiple beam generator and controller 102 is input to optical apparatus 118 which is identical in design and functionality to optical readout apparatus 106. Optical apparatus 118 generates an array of recording reference light beams 120 having independently controllable angles of incidence with respect to the second holographic data storage medium, and illuminates the plurality of copy sites of second holographic data storage medium. Optical apparatus 118 provides a set of recording reference beams which interfere with the array of optical data signals 112 to produce a set of light interference patterns, resulting in the parallel holographic recording of the data stored in the first holographic data storage medium into the second holographic data storage medium while, at the same time, implementing a page address remapping method for randomly assigning a page address to each of the plurality of copy data pages.

The combination of optical apparatus 110 and optical apparatus 118 provides for the remapping of selected data ages from a first plurality of data sites in the first holographic data storage medium to a plurality of different data sites in the second holographic data storage medium where the data pages can be holographically recorded with copy angular addresses different from the page addresses in the first holographic data storage medium. Additionally, optical apparatus 114 enables data regeneration by providing gain and thresholding to the parallel data recording in the second holographic data storage medium, which maintains the signal to noise of the original data in the copy.

Figure 2:
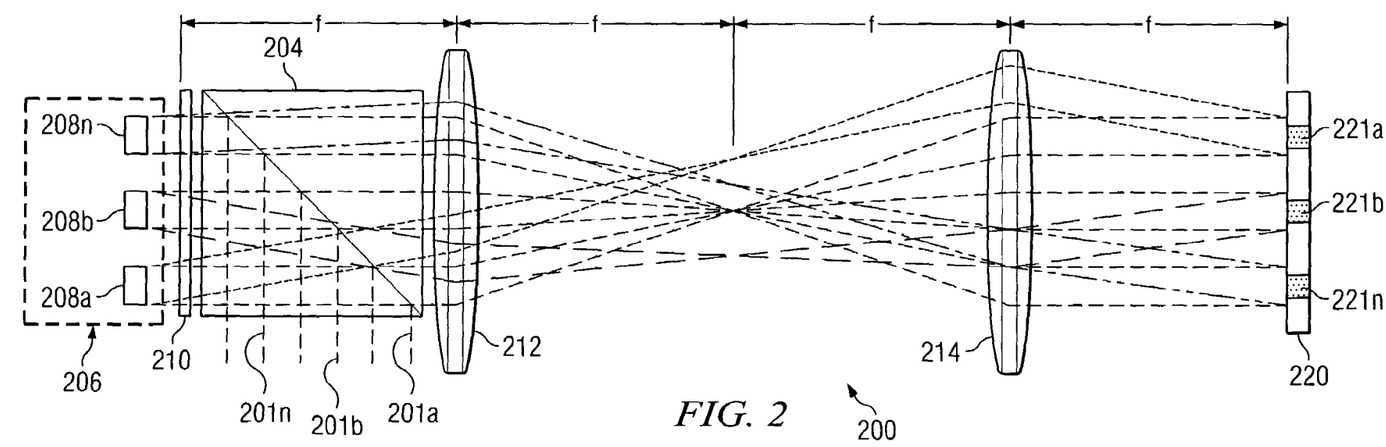
FIG. 2 is a schematic top view of a system for parallel selective retrieval of data stored in a holographic data storage medium in accordance with a preferred embodiment of the present invention.

FIG. 2 is a schematic top view of a system for parallel selective retrieval of data stored in a holographic data storage medium in accordance with a preferred embodiment of the present invention. The system is generally designated by reference number 200, and includes a plurality of linearly polarized light beams 201a–201n that define a light beam array of N light beams, for example, a 10×10 array of 100 light beams, although it should be understood that the invention is not limited to an array of any particular size or shape or to any particular number of light beams forming the array.

The plurality of linearly polarized input beams 201a–201n, only three of which are illustrated in FIG. 2, are reflected by polarizing beam splitter (PBS) 204 onto a reflective or transmissive multi-element spatial light modulator (SLM) 206. SLM 206 comprises an array of at least N elements which are individually addressable.

In the preferred embodiment illustrated in FIG. 2, SLM 206 is implemented by a micro-electro-mechanical system (MEMS) fabricated micro-mirror array. Individual light beams 201a–201n are incident, respectively, on micromirrors 208a–208n which independently deflect the N individual light beams 201a–201n in the plane constituted by the optical axis of the optical system and the array of input light beams, thus creating a plurality of reflected reference light beams with individual deflection angles.

When using a reflective SLM, a quarter wave plate 210 oriented at 45 degrees with respect to the direction of polarization of the plurality of input light beams is placed between PBS 204 and SLM 206. Quarter wave plate 210 transforms the incident linear polarized beams 201a–201n into circular polarized beams, the handedness of the circular polarization depending on the relative orientation of the incident polarization with respect to the fast axis of quarter wave plate 210, whereas the effect of the reflective elements of SLM 206 is to change the handedness of the circular polarization. The backward propagating beams deflected by SLM 206 are thus circularly polarized with the opposite handedness, and are thus transformed by quarter wave plate 210 into linear polarized beams, but with orthogonal polarization with respect to the direction of linear polarization of the incident beams. The deflected backward-propagating light beams are then transmitted through PBS 204.

According to an alternative embodiment of the present invention, SLM 206 can be implemented as a liquid crystal spatial light modulator (LC-SLM). An LC-SLM comprises a rectangular array of PxQ individually controllable pixels, which can be organized into N regions comprising PxQ/N pixels. In a suitable configuration, each pixel can impart a controllable relative phase to the light incident thereupon. The individual pixels forming each region can be configured to form a reconfigurable phase grating, which diffracts incident light. Changing the periodicity of the phase diffraction grating results in a change in the deflection angle imparted to an individual beam. In this manner, the N individual input beams can be individually deflected by the SLM based on a liquid crystal array in a manner equivalent to a MEMS-based mirror array. An LC-SLM can be used both in a reflective configuration or a transmissive configuration.

According to the preferred embodiment of FIG. 2, MEMS micro-mirror array 208a–208n is imaged onto holographic data storage medium 220 by a 2-lens 4-f system comprising lenses 212 and 214. The lenses 212 and 214 are of equal focal length and positioned such that the image focal plane of lens 212 coincides with the object focal plane of lens 214 to form a negative unity magnification telescope. MEMS mirror array 208a–208n is positioned in the object plane of lens 212, and holographic data storage medium 220 is positioned in the image plane of lens 214, such that the image of each individual mirror 208a–208n of the MEMS micro-mirror array coincides with an individual data storage site 221a–221n in holographic data storage medium 220. The effect of the 4-f system is to maintain the respective positions of incidence of the individual beams coincident with the individual data storage sites 221a–221n of holographic data storage medium 220, with the variable angles of incidence opposite to the individual reflection angles imparted by corresponding micro-mirrors 208a–208n. The 4-f imaging system is independent of the particular type of SLM, and thus is applicable to alternative embodiments employing either a transmissive or reflective SLM.

System 200 provides a mechanism for independently varying the angles of incidence of the individual light beams that illuminate the plurality of data sites 221a–221n in holographic data storage medium 220; and, accordingly, is suitable for the parallel readout of a plurality of angle multiplexed data pages or units stored at the plurality of data sites. By controlling the angles of incidence of the plurality of light beams at each data site, system 200 further includes the capability of independently selecting and retrieving any data unit among the plurality of angle multiplexed data units recorded at each data site of data storage medium 220. By controlling the number of light beams to which optical power is distributed among the plurality of available light beams, each light beam illuminating a different one of the plurality of data sites, system 200 further includes the capability of selectively accessing only the data sites among the plurality of accessible data sites which contain data to be retrieved.

Figure 3:
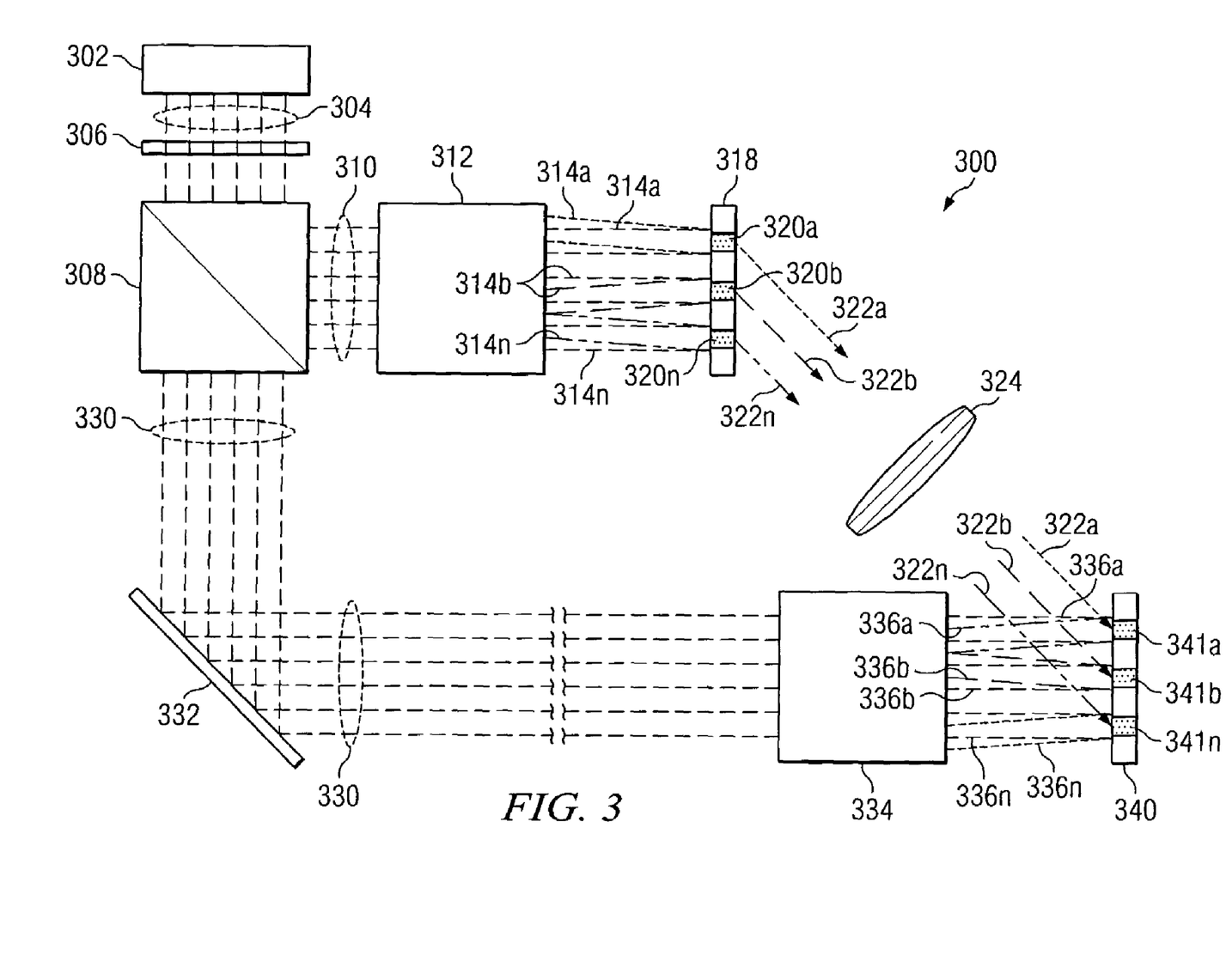
FIG. 3 schematically illustrates a holographic data parallel selective replication and data address remapping system in accordance with a preferred embodiment of the present invention.

FIG. 3 schematically illustrates a holographic data parallel selective replication and angular address remapping system in accordance with a preferred embodiment of the present invention. The replication system is generally designated by reference number 300 and includes an optical power distribution system 302 that provides a plurality of up to N illumination beams 304 which are split into two multiple beam arrays 310 and 330 by polarization beam splitter (PBS) 308. A wave plate 306 is positioned in the optical path prior to PBS 308 and serves to adjust the splitting ratio. For linear polarized beams, a half-wave plate acting as a polarization rotator can be used.

Optical power distribution apparatus 302 can be implemented in several ways. According to a preferred embodiment of the present invention, optical power distribution apparatus 302 can comprise one or more optical power sources and an arrangement of one or more optical couplers for coupling the output power of at least one output of the one or more optical power sources to a plurality of optical inputs forming the plurality of light beams 304. Preferably, the one or more optical couplers are tunable fiber-optic couplers, which allow adjustment of the coupling ratio of the optical power to each one of multiple fiber outputs (or respective fiber inputs of the multi-beam array). If the tunable couplers have a tuning range down to a virtually zero output level, redistribution of the available optical power among any of the up to N multiple inputs is permitted based on the number of required inputs among the N available inputs. Co-pending application entitled "OPTICAL POWER DISTRIBUTION MANAGEMENT AND APPARATUS", Ser. No. 10/749,427, filed on Dec. 31, 2003, assigned to the same assignee as the present invention and incorporated herein by reference, discloses a preferred implementation for delivering optical power to multiple optical inputs.

Returning to FIG. 3, the first multiple beam array 310 is reflected by PBS 308 and serves as an input to an optical apparatus 312, which, together with first holographic data storage medium 318, may be implemented as system 200 illustrated in FIG. 2. Optical apparatus 312 transforms the plurality of input beams 310 into a plurality of individually deflected reference light beams, which are thereafter projected as a plurality of reference light beams 314a–314n, onto first, source holographic data storage medium 318 such that the array of reference light beams 314a–314n illuminate a corresponding array of individual data sites 320a–320n in first holographic data storage medium 318.

As described previously with reference to FIG. 2, the particular spatial configuration of reference beams 314a–314n can be adapted to match the various possible spatial arrangements of data sites 320a–320n. The array of reference beams 314a–314n simultaneously access the corresponding array of data sites 320a–320n and give rise to an array of diffracted optical data signal beams 322a–322n, each corresponding to an independently selected data page or data unit among the plurality of data pages or data units holographically stored at each data site. Diffracted optical data signal beams 322a–322n are then imaged by a single lens 324 onto second, replication holographic data storage medium 340 at data sites 341a–341n thereof. Although not illustrated in FIG. 3, a mirror may be provided to guide diffracted optical signal beams 322a–322n onto second holographic data storage medium 340.

The second input light beam array 330 that is transmitted through polarization beam splitter 308, is directed to optical apparatus 334 by mirror 332. Optical apparatus 334 corresponds to optical apparatus 312 and configures the array of input beams 330 into an array of recording reference beams 336a–336n with independently configurable angles of incidence, and project the images thereof onto data sites 341a–341n of second holographic data storage medium 340.

The optically reconstructed signals interfere with the corresponding recording reference beams 322a–322n in second holographic data storage medium 340 thus producing interference patterns which are recorded in the second holographic data storage medium as multiple volume gratings with different orientation angles, corresponding to the different angles of incidence selected for each of the recording reference beams, and constituting the angular addresses of the data pages replicated from first holographic data storage medium 318.

The same process is repeated until all the pages stored within each data site in first holographic data storage medium 318 to be replicated have been replicated. In the case where only a partial set of data pages or data units stored within each data site in first holographic data storage medium 318 are to be replicated, optical power distribution system 302 used in combination with optical apparatus 312 distributes power only to the plurality of beams which access a data site with pages remaining to be copied. This enables parallel partial content selection, which can also be described as content editing, from the entire content stored in the multiple data sites in first holographic data storage medium 318.

Replication system 300 illustrated in FIG. 3 thus provides for parallel replication of data units stored at data sites in first holographic data storage medium 318 in second holographic data storage medium 340. The capability of independently configuring the individual light beams forming the array of recording beams allows different replication addresses to be assigned, constituted by the incidence angles imparted to the corresponding recording reference beams, to each data page being replicated in the second holographic data storage medium, which can be different from its source address or angle of incidence used to access the data page stored in the first holographic data storage medium. Thus, the present invention also permits data migration by enabling data to be copied from a given angular page address in the first holographic data storage medium to a different angular page address in the second holographic data storage medium.

Figure 4:
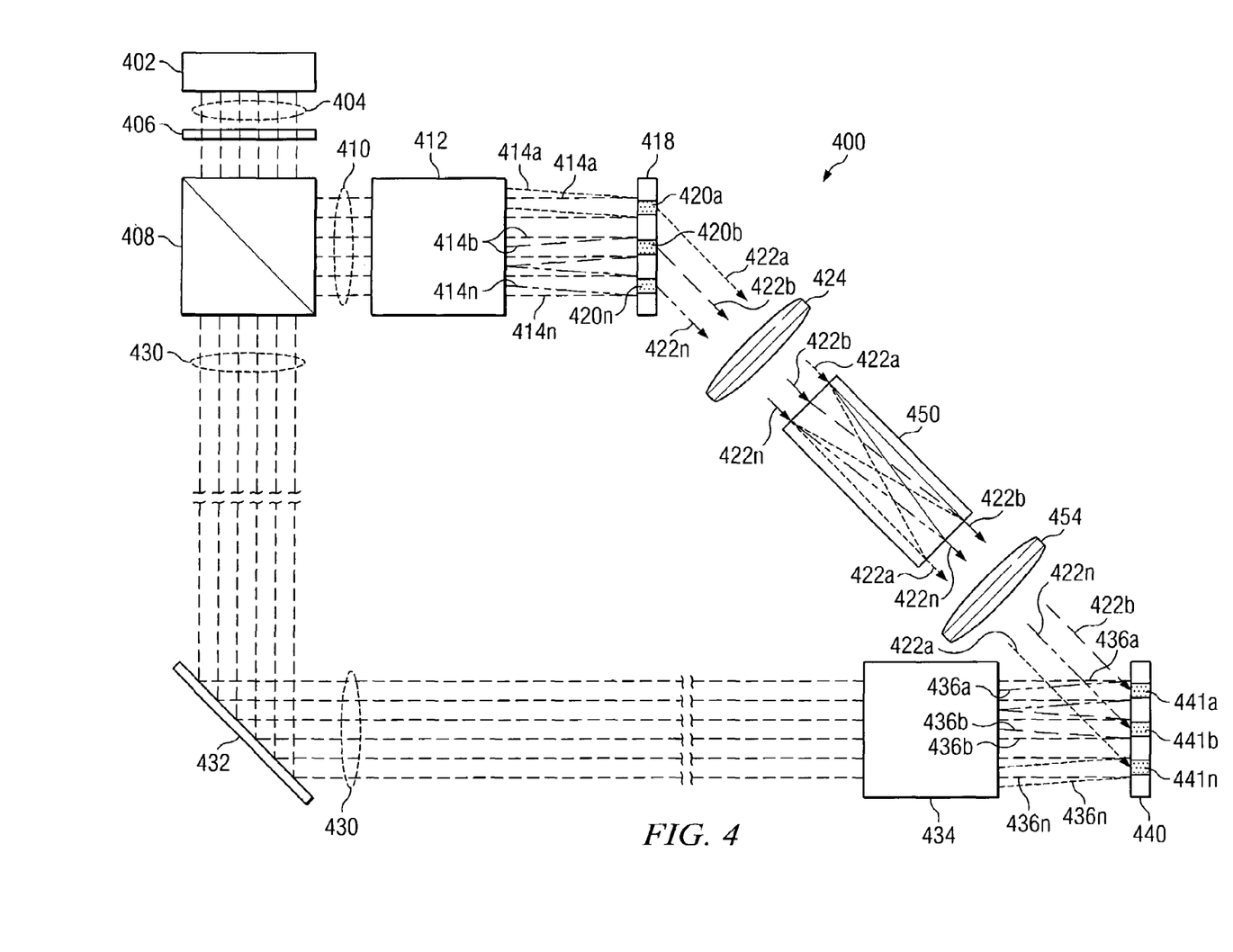
FIG. 4 schematically illustrates a holographic data parallel selective replication and data address remapping system, similar to the system illustrated in FIG. 3, and further incorporating a parallel data re-routing capability in accordance with a preferred embodiment of the present invention.

FIG. 4 schematically illustrates a holographic data parallel selective replication and address remapping system, similar to the system illustrated in FIG. 3 and further incorporating a parallel data re-routing capability in accordance with a preferred embodiment of the present invention. The system is generally designated by reference number 400 and is generally similar to system 300 illustrated in FIG. 3, such that similar reference numbers are used for corresponding components in FIG. 3 and FIG. 4. System 400 differs from system 300 in that system 400 includes an optical cross-connect apparatus 450 for spatially redirecting the diffracted individual optical data signal beams 422a–422n forming the array of input data beams from a relative input position to a different relative output position to provide a spatially re-arranged array of data signals. The re-arranged array of data signals are directed through and imaged by lens 454 onto second holographic data storage medium 440 where they interfere with the array of multiple recording reference beams 436a–436n. System 400, accordingly, permits data units stored at particular data sites among the plurality of simultaneously accessed data sites in first holographic data storage medium 418 to be replicated at selected different copy data sites among the corresponding plurality of copy data sites in second holographic data storage medium 440.

Optical apparatus 450 is described in greater detail in the above-identified, commonly assigned, co-pending application entitled "SYSTEM AND METHOD FOR PARALLEL SELECTIVE REPLICATION AND DATA ADDRESS REMAPPING OF DATA CONTENT STORED IN A HOLOGRAPHIC DATA STORAGE MEDIUM", Ser. No. 11/021,667.

System 400 illustrated in FIG. 4 provides a mechanism for reclaiming capacity held by now useless content stored in a first, source holographic data storage medium by first enabling parallel retrieval of selected partial content, and then remapping the data address and replicating the partial content to a second, replication holographic data storage medium. The content remapping functionality permits maximum utilization of the capacity of the second, replication data storage medium by merging the partial useful contents of multiple first, source holographic data storage media onto a single second, replication holographic data storage medium. The merging is effected by first replicating in parallel the selected useful content from a first source holographic medium, and subsequently replicating the selected useful content from additional source holographic media, until full utilization of the capacity of the single, second replication holographic data storage medium is achieved.

As indicated previously, in a holographic data replication system, such as holographic data replication systems 300 and 400 illustrated respectively in FIG. 3 and FIG. 4, copies (and copies of the copies) replicated from originally stored data present a lower signal-to-noise ratio (SNR), and therefore a lower level of data integrity, than the originally stored data. Today's data storage systems provide electronic signal processing (typically by digital processes after an analog to digital conversion of the data has occurred) to maintain the integrity of the data by preserving its SNR. However, the cost, complexity, limitations and latencies associated with a multi-channel page based electronic signal processing scheme makes a parallel optical processing solution more desirable. Accordingly, in order to maintain the data rate performance advantages provided by holographic data replication systems such as holographic data replication systems 300 and 400, where data originally stored in a first holographic data storage medium, such as data storage medium 318 in FIG. 3 and 418 in FIG. 4, is simultaneously retrieved and directly replicated in a second holographic data storage medium, such as data storage media 340 in FIG. 3 and 440 in FIG. 4, an optical mechanism is needed to simultaneously maintain signal-to-noise ratio of data during its recording and replication to a different copy data address.

Figure 5:
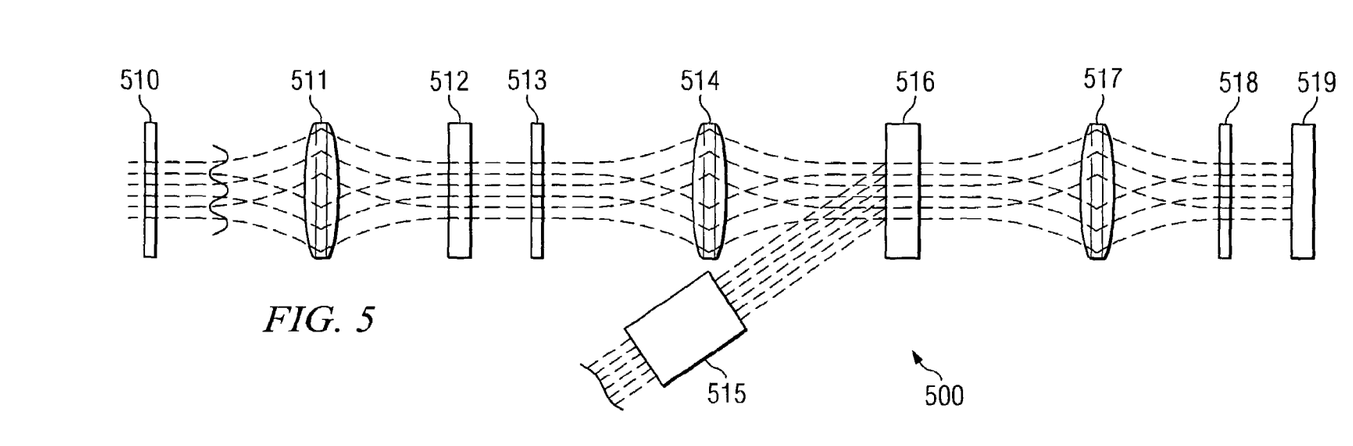
FIG. 5 schematically illustrates an apparatus for providing gain and thresholding to a holographic data, parallel recording and replication system incorporating independent angular address assignment in accordance with a preferred embodiment of the present invention.

FIG. 5 schematically illustrates an apparatus for providing gain and thresholding to a holographic data, parallel recording and replication system incorporating independent angular address assignment in accordance with a preferred embodiment of the present invention. The system is generally designated by reference number 500, and has an objective of maintaining the signal-to-noise ratio of data replicated in holographic data storage medium 516.

System 500 is generally similar to the recording portion of systems 300 and 400, respectively illustrated in FIGS. 3 and 4 except that additional optical elements are placed along the information bearing light beam arm of the replication system, such that their combination forms a resonant cavity around the holographic data storage medium 516.

The above-identified co-pending, commonly assigned patent application entitled "SCHEME CAPABLE OF PROVIDING GAIN AND THRESHOLDING TO THE PARALLEL RECORDING AND REPLICATION OF HOLOGRAPHIC MEDIA", Ser. No. 10/934,185, filed on Sep. 3, 2004, the disclosure of which is hereby incorporated by reference, discloses the use of a resonant cavity for providing gain and thresholding to the holographic parallel recording of data. In the application, parallel recording is achieved by means of a single reference recording beam mutually interfering, within a holographic data storage medium, with multiple spatially separated data beams to affect the parallel recording of multiple holograms with identical angular addresses, the cavity being formed along the reference beam arm. In the present invention, both recording arms comprise a multiple beam array, as the parallel recording or replication system further includes the capability of independent angular address assignment to each of the data units being recorded simultaneously, by utilizing a plurality of recording reference beams with dynamically configurable angles of incidence. In this case it is not possible to form a cavity along the reference arm capable of circulating a plurality of angularly reconfigurable beams, thus requiring a different setup to enable the formation of a resonant cavity around the holographic data storage medium. In this case it is more appropriate to form the cavity along the information bearing light beam arm, in which the plurality optical data beams form an array of optical beams collinearly propagating along a fixed direction. The problem remains that outside of an image plane of the first holographic medium, from which data is retrieved, the plurality of optically retrieved data signals corresponds to a plurality of non plane wave and mutually overlapping beams. Thus at each point outside of an image plane, overlapping components from different data signal beams have different wave vectors. In this case, this requires using a pair of phase conjugate mirrors to retroreflect the plurality of coincident light beams with different angles of incidence, placed appropriately so as to form a resonant cavity. If instead, the reflective elements are placed in an image plane of the first holographic data storage medium; in this plane, the plurality of data bearing light beams form a plurality of spatially separated plane waves, thus allowing the use of plane reflective elements to form the resonant cavity.

Returning to FIG. 5, an incident array of optical data signals is formed by multiple data beams, generated from the simultaneous readout of multiple holograms recorded initially as Fourier holograms in a first holographic data storage medium. The incident array is focused by lens 511 onto a first image plane that corresponds to an image plane of the plane containing the source holograms in FIG. 3 and in FIG. 4, and wherein the incident beams form an array of spatially separate, normally incident and focused plane wave beams. When incorporating system 500 into systems 300 and 400 respectively illustrated in FIGS. 3 and 4, lens 511 is implemented respectively by lenses 324 and 454. A partially reflecting mirror 512, which can be a flat mirror, is placed in this first image plane and transmits the array of incident data beams.

A second lens 514 focuses the transmitted array of incident light beams onto a second image plane within holographic data storage medium 516, which can be a photosensitive polymer. Holographic data storage medium 516 can be implemented as holographic data storage medium 340 in FIG. 3 and 440 in FIG. 4. The transmitted, now diverging data beams are then focused by a third lens 517 onto a highly reflecting flat mirror 519. The pair of mirrors 512 and 519 each act to reflect back the data beams exactly on themselves and, with an appropriate choice of the focal lengths of lenses 514 and 517, thus define a resonant cavity around holographic data storage medium 516.

In an alternative embodiment, the holographic data storage medium can be a single-sided medium which includes a highly reflective layer, in addition to the holographic recording layer constituted by the photosensitive polymer. In this case, a similar arrangement can be used to form a resonant cavity, folded with respect to the holographic data storage medium.

In addition to the array of data beams, apparatus 515 provides a set of recording reference beams also illuminating the holographic recording medium 516 at independently controlled angles of incidence and each overlapping with a respective data beam. Apparatus 515 can be implemented as optical apparatus 334 in FIG. 3 or optical apparatus 434 in FIG. 4. Holographic data storage medium 516 is thus exposed to a set of spatially modulated light intensity patterns with adjustable angular orientations, formed by the interference of the set of data beams with the set of recording reference beams with independently adjustable orientation angles produced by apparatus 515.

The light intensity gratings are recorded within holographic data storage medium 516 as a set of initially weak holograms which, in turn, start diffracting the respective associated recording reference beams. The interaction between an individual reference beam and its associated grating couples a diffracted signal coherent with and propagating in the same direction as the associated recording data beam, adding to the latter's energy within the resonant cavity. This results in providing gain to system 500. In addition, in the case of a photopolymer holographic data storage medium, the exposure to light results in bleaching of the photopolymer material over time, with a corresponding increase in the transmission of the material, thereby reducing loss, and providing additional gain within the cavity.

Furthermore, since the data information contained in the data beams is represented as a spatial modulation pattern of the intensity thereof, this produces a spatially non-uniform increase of the gain of system 500 thereby providing a positive feedback mechanism to the system. This latter phenomenon thus implements a spatial thresholding operation concurrent to the hologram recording. This leads to a nonlinear increase in the recording strength of the grating, and also results in an increase in the contrast of the digital page hologram. The thresholding provided to the recording process enables maintaining a high signal-to-noise ratio between bits representing "1"s and "0"s, while the overall gain allows for further speedup of the recording process.

The resonant cavity formed around holographic data storage medium 516 causes the medium to be illuminated by both forward and counter-propagating data beams, both of which can interfere with the reference beams. In the case where the holographic data storage medium can record both reflection and transmission gratings, in order to prevent the undesirable formation of reflection holograms resulting from the interference of the counter propagating data beams with the reference beams, a pair of quarter wave plates 513 and 518, oriented at 45 degrees, are provided on opposite sides of holographic data storage medium 516.

As mentioned previously, the combined effect of a quarter wave plate, which transforms an incident linear polarized beam and a circular polarized beam, and of a reflective mirror which changes the handedness of a circularly polarized beam, transforms an incident linearly polarized beam into a counter-propagating linearly polarized beam, with orthogonal orientation of polarization. An additional quarter wave plate 510 can be placed outside the resonant cavity to control the initial polarization of the incident beams. By an appropriate choice of the initial state of polarization, it is then possible to ensure that only the forward propagating data beams are linearly co-polarized with the reference recording beams within the recording medium.

Figure 6:
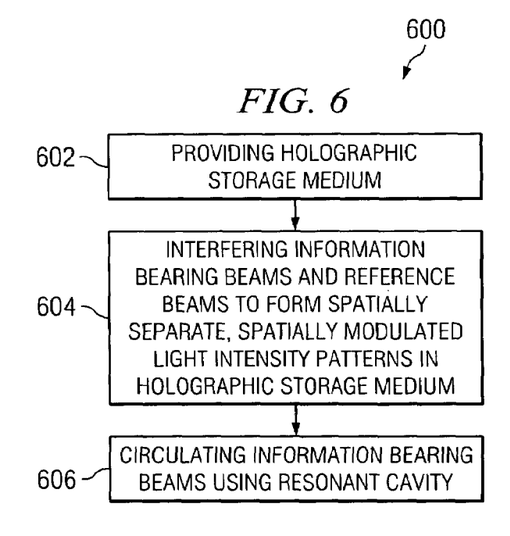
FIG. 6 is a flowchart that illustrates a method for holographic data parallel recording and independent data address assignment, whereby data signal to noise ratio is enhanced by providing gain and thresholding, in accordance with a preferred embodiment of the present invention.

FIG. 6 is a flowchart that illustrates a method for holographic data parallel recording and independent data address assignment, whereby data signal to noise ratio is enhanced by providing gain and thresholding, in accordance with a preferred embodiment of the present invention. The method is generally designated by reference number 600, and begins by providing a holographic data storage medium (Step 602). A plurality of spatially separate information bearing light beams in an information bearing light beam arm of a data recording system and a plurality of reference light beams in a reference light beam arm of the data recording system illuminate the holographic data recording medium and interfere to form a plurality of spatially modulated light intensity patterns, with independently assignable angular orientations, which are simultaneously recorded as spatially separated holograms in the holographic data storage medium in a parallel data recording operation (Step 604). During the parallel data recording operation, the plurality of information bearing light beams are repeatedly circulated through the holographic data storage medium using a resonant cavity formed along the information-bearing light beam arm of the holographic data recording system, thus creating positive feedback to the recording process resulting in an increase in data signal to noise ratio (Step 606).

The present invention thus provides a system and method for providing gain and thresholding in a holographic data parallel replication and independent angular address assignment system. A plurality of information bearing light beams in an information bearing light beam arm of a data recording system and a plurality of reference light beams in a reference light beam arm of the data recording system are mutually interfered to form a plurality of spatially separate, spatially modulated light intensity patterns in a holographic data storage medium in a data recording operation. During the data recording operation, the plurality of information bearing light beams are repeatedly circulated through the holographic data storage medium using a resonant cavity formed along the information-bearing light beam arm of the holographic data recording system. The invention provides gain and thresholding to a holographic data, parallel recording and independent angular address assignment system, which enables an increase in data recording speed and the preservation of signal-to-noise ratio of the original data in the copy.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles and novel features of the invention, the practical application, and to enable others of ordinary skill in the art to understand the invention for various embodiments with various modifications as are suited to the particular, but not limited to, use contemplated.

What is claimed is:

1. A method for holographically storing data comprising:
   providing a holographic data storage medium;
   mutually interfering a plurality of information bearing light beams in an information bearing light beam arm of a data recording system and a corresponding plurality of reference light beams in a reference light beam arm of the data recording system to form a plurality of spatially separate, spatially modulated light intensity patterns in the holographic data storage medium in a data recording operation; and
   during the data recording operation, repeatedly circulating the plurality of information bearing light beams through the holographic data storage medium using a resonant cavity.

2. The method according to claim 1, wherein the plurality of information bearing light beams is provided from a parallel readout of optically modulated data.

3. The method according to claim 1, wherein each of the plurality of reference light beams in the reference light beam arm of the data recording system is assigned an angle of incidence among a plurality of assignable angles of incidence, and wherein the plurality of spatially separate, spatially modulated light intensity patterns are recorded as a plurality of data units, each stored at a different data site in the holographic data storage medium, and wherein each of the plurality of data units is recorded with a recording angular address corresponding to a selected angle of incidence of a different one of the plurality of reference light beams in the holographic data storage medium.

4. The method according to claim 1, wherein positive feedback in the resonant cavity provides an increase in gain and thresholding.

5. The method according to claim 4, wherein the holographic data storage medium comprises a photopolymer holographic data storage medium, and wherein the positive feedback results from an increase in light transmission of the photopolymer holographic data storage medium due to accumulated light exposure.

6. The method according to claim 1, wherein the resonant cavity is formed using a first mirror and a second mirror placed along the optical path of the information bearing light beam arm of the data recording system, wherein the first mirror is a partially reflecting mirror, and wherein the second mirror is a highly reflecting mirror.

7. The method according to claim 6, wherein the first mirror and second mirror are placed in image planes of the plane from which the information light beams are retrieved, and further including providing first, second, and third lenses along the optical path, wherein the first lens placed before the cavity provides a first image plane located on the first mirror; wherein the second lens provides a second image plane situated within the holographic data storage medium, and wherein the third lens provides a third image plane on the second mirror.

8. The method of claim 7, wherein the first and second mirrors comprise plane mirrors.

9. The method according to claim 6, wherein the first and second mirrors comprise phase conjugate mirrors, and further including a lens placed before the cavity for forming an image of the plurality of information bearing light beams on the holographic data storage medium.

10. The method according to claim 6, and further including:
provided at least one polarization controlling optical element within the resonant cavity to prevent formation of reflection holograms, by orthogonally polarizing light beams propagating in opposite directions;
providing a polarization controlling optical element along the information bearing light beam arm of the data recording system outside the resonant cavity to control initial polarization of the information bearing light beams.

11. A data recording system for holographically storing data, comprising:
a holographic data storage medium illuminated by a plurality of spatially separate information bearing light beams in an information bearing light beam arm of the data recording system, and a corresponding plurality of reference light beams in a reference light beam arm of the data recording system that interfere to form a plurality of spatially modulated light intensity patterns in the holographic data storage medium in a data recording operation; and
a resonant cavity formed along the information bearing light beam arm of the data recording system for repeatedly circulating the plurality of information bearing light beams through the holographic data storage medium during the data recording operation.

12. The system according to claim 11, wherein the plurality of information bearing light beams is provided from a parallel readout of optically modulated data.

13. The system according to claim 11, wherein each of the plurality of reference light beams in the reference light beam arm of the data recording system is assigned an angle of incidence among a plurality of assignable angles of incidence, and wherein the plurality of spatially separate, spatially modulated light intensity patterns are recorded as a plurality of data units each stored at a different data site in the holographic data storage medium, and wherein each of the plurality of data units is recorded with a recording angular address corresponding to a selected angle of incidence of a different one of the plurality of reference light beams in the holographic data storage medium.

14. The system according to claim 11, wherein a positive feedback mechanism in the resonant cavity provides an increase in gain and thresholding.

15. The system according to claim 14, wherein the holographic data storage medium comprises a photopolymer holographic data storage medium, and wherein the positive feedback results from an increase in light transmission of the photopolymer holographic data storage medium due to accumulated light exposure.

16. The system according to claim 11, wherein the resonant cavity is formed using a first mirror and a second mirror placed along the optical path of the information bearing light beam arm of the data recording system, and wherein the first mirror is a partially reflecting mirror, and wherein the second mirror is a highly reflecting mirror.

17. The system according to claim 16, wherein the first mirror and second mirror are placed in image planes of the plane from which the information light beams are retrieved, and further including providing first, second, and third lenses along the optical path, wherein the first lens placed before the cavity provides a first image plane located on the first mirror; wherein the second lens provides a second image plane situated within the holographic data storage medium, and wherein the third lens provides a third image plane on the second mirror.

18. The system according to claim 17, wherein the first and second mirrors comprise plane mirrors.

19. The system according to claim 16, wherein the first and second mirrors comprise phase conjugate mirrors, and further including a lens placed before the cavity for forming an image of the plurality of information bearing light beams on the holographic data storage medium.

20. The system according to claim 16, and further including:
at least one polarization controlling optical element within the resonant cavity to prevent formation of reflection holograms by orthogonally polarizing light beams propagating in opposite directions; and
a polarization controlling optical element along the information bearing light beam arm of the data recording system outside the resonant cavity for controlling initial polarization of the information bearing light beams.

* * * * *